United States Patent
Cheng et al.

(10) Patent No.: US 7,031,380 B1
(45) Date of Patent: Apr. 18, 2006

(54) MULTI-CLIENT ADSL MODEM

(75) Inventors: Yaqi Cheng, Smyrna, GA (US); Yaser M. Ibrahim, Richardson, TX (US); Song Wu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 959 days.

(21) Appl. No.: 09/651,976

(22) Filed: Aug. 31, 2000

Related U.S. Application Data

(60) Provisional application No. 60/156,484, filed on Sep. 28, 1999.

(51) Int. Cl.
*H04L 1/38* (2006.01)
*H04L 12/56* (2006.01)

(52) U.S. Cl. .................................. 375/222; 370/352

(58) Field of Classification Search ............... 375/222; 370/293–389, 468, 408, 480, 489, 498, 352, 370/421
See application file for complete search history.

(56) References Cited

U.S. PATENT DOCUMENTS

| | | | | |
|---|---|---|---|---|
| 5,479,447 | A | | 12/1995 | Chow et al. ............... 375/260 |
| 5,812,786 | A | * | 9/1998 | Seazholtz et al. .......... 709/233 |
| 5,896,443 | A | * | 4/1999 | Dichter ................... 379/93.08 |
| 5,933,454 | A | * | 8/1999 | Cioffi ....................... 375/260 |
| 6,279,022 | B1 | * | 8/2001 | Miao et al. ................ 708/404 |
| 6,295,293 | B1 | * | 9/2001 | Tonnby et al. ............ 370/389 |
| 6,351,487 | B1 | * | 2/2002 | Lu et al. .................... 375/225 |
| 6,389,062 | B1 | * | 5/2002 | Wu ........................... 375/222 |
| 6,424,661 | B1 | * | 7/2002 | Bentley ..................... 370/482 |
| 6,430,199 | B1 | * | 8/2002 | Kerpez ..................... 370/493 |
| 6,434,119 | B1 | * | 8/2002 | Wiese et al. .............. 370/252 |

(Continued)

FOREIGN PATENT DOCUMENTS

WO    WO 98 20649 A    5/1998

Primary Examiner—Emmanuel Bayard
Assistant Examiner—Lawrence B. Williams
(74) Attorney, Agent, or Firm—Abdul Zindani; W. James Brady, III; Frederick J. Telecky, Jr.

(57) ABSTRACT

A multi-client ADSL modem network (10) that can be configured for a home or office network when multiple ADSL client modems (18) are installed in different communication terminals (22). One ADSL modem (14) at a central office (12) coordinates the remote multi-client modems (18) for communication over a single twisted pair loop carrier phone line (16), allowing the connected modems (18) to communicate not only with the CO modem (14), but also with each other by sharing frames, tones, or by code division techniques on upstream channels. The CO modem (14) operates as a network hub and/or arbitrator, and facilitates one ADSL modem to become the master modem and maintain a superframe. The present invention provides home network ADSL service without extra wiring or equipment, thus providing a low cost approach for home networking of ADSL service.

22 Claims, 3 Drawing Sheets

U.S. PATENT DOCUMENTS

| | | | |
|---|---|---|---|
| 6,434,123 B1 * | 8/2002 | Park | 370/293 |
| 6,459,684 B1 * | 10/2002 | Conroy et al. | 370/286 |
| 6,473,438 B1 * | 10/2002 | Cioffi et al. | 370/468 |
| 6,480,475 B1 * | 11/2002 | Modlin et al. | 370/294 |
| 6,498,806 B1 * | 12/2002 | Davis | 375/222 |
| 6,498,807 B1 * | 12/2002 | Hwang | 375/222 |
| 6,501,791 B1 * | 12/2002 | Hwang | 375/222 |
| 6,584,079 B1 * | 6/2003 | Willer | 370/284 |
| 6,590,893 B1 * | 7/2003 | Hwang et al. | 370/354 |
| 6,603,808 B1 * | 8/2003 | Anne et al. | 375/222 |
| 6,636,505 B1 * | 10/2003 | Wang et al. | 370/352 |
| 6,704,317 B1 * | 3/2004 | Dobson | 370/401 |
| 2001/0012319 A1 * | 8/2001 | Foley | 375/222 |
| 2002/0136167 A1 * | 9/2002 | Steele et al. | 370/260 |

* cited by examiner

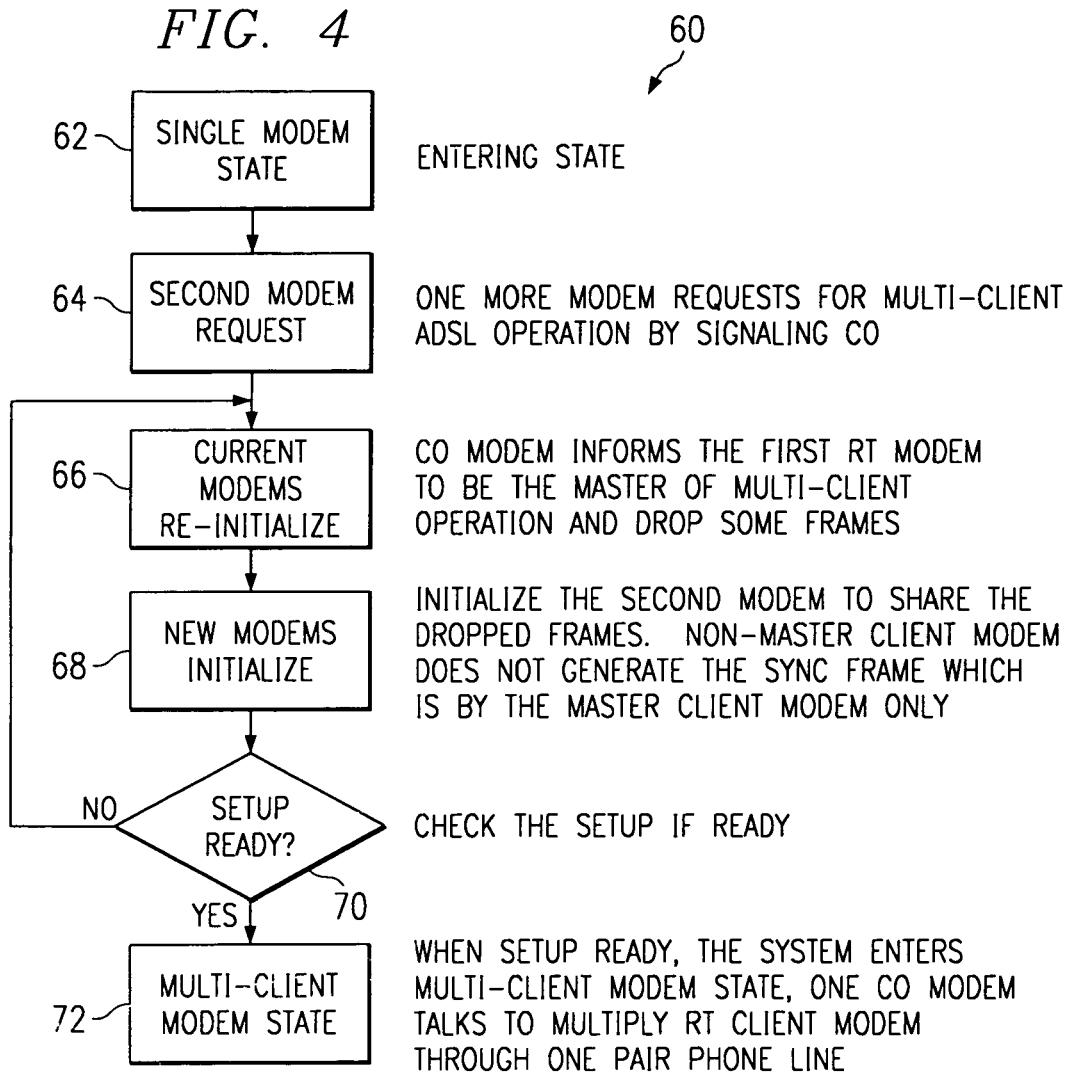

MULTI-CLIENT ADSL MODEM

PRIORITY

This application claims priority under 35 USC §119(e)(1) of Provisional Application No. 60/156,484, filed Sep. 28, 1999.

FIELD OF THE INVENTION

The present invention is generally related to communication networks, and more specifically to networks adapted to communicate over standard residential 2-wire phone lines including those adapted to support ADSL communications.

BACKGROUND OF THE INVENTION

Asymmetrical Digital Subscriber Lines (ADSL) is an ANSI standard identified as TI.413 issued in 1995 which presents the electrical characteristics of the ADSL signal as it should appear at a network interface. Generally, ADSL is a high-speed communication technology that allows one client modem, such as that at a remote terminal (RT), to be connected to only one central office (CO) modem through one twisted pair telephone line forming a loop. Typically, discrete multi-tone (DMT) modulation is the chosen line code technique standard in a typical ADSL system. Upstream communications, such as from RT to CO, and downstream communications, such as CO to RT, are divided from one another using frequency division multiplexing (FDM) or using echo canceling, allowing the frequency band for upstream communications to be shared with downstream communications thereby increasing the overall data rate over the loop.

Disadvantageously, the ADSL standard allows only one pair of modems (CO and RT) to communicate over a loop at the same time. The CO modem may send a downstream signal while simultaneously receiving an upstream signal from the RT, frame by frame. Similarly, the RT modem may receive the downstream communication from the CO modem and simultaneously send upstream communication signals to the CO modem.

Since the standardization of ADSL communications, there have been introduced varied implementations and customized uses of the ADSL technology, such as disclosed in commonly assigned U.S. Pat. No. 5,479,447 entitled "Method and Apparatus for Adaptive, Variable Bandwidth, High-Speed Data Transmission of a Multi-Carrier Signal over Digital Subscriber Lines," the teachings of this patent included herein by reference.

As homes and offices become more networked, there are typically multiple communication terminals and devices in the residential house or office, and local networks are likely installed to share resources, such as internet access, printers, and so on. Home networks are particularly unique in that cost and wiring issues are key considerations. The IEEE 1394 standard has been recently developed which provides for data speeds up to hundreds Mbps. However, the IEEE 1394 standard also requires special cabling for connection, and is not adapted to operate over the common twisted pair telephone lines wired typically throughout a home, for example. A new consortium of home networking, known as Home Phoneline Networking Alliance (HomePNA), was formed. HomePNA is able to connect PCs and peripherals within a household through a single pair phone line shared not only with the telephone sets, but also with xDSL services provided by modems exchanging information over the conventional twisted pair phone lines. HomePNA runs at the frequency range from 5.5 MHz to 9.5 MHz, while the Plain Old Telephone Service (POTS) operates in the frequency range under 4 KHz, and the xDSL service operates at the frequency range from 275 KHz to 1 MHz. The current available HomePNA technology can provide 1 Mbps Ethernet local networking, and may reach 10 Mbps in the near future.

SUMMARY OF THE INVENTION

The present invention achieves technical advantages as a Multi-Client ADSL Modem and network that can be configured as a home network by providing multiple ADSL modems installed in different communication terminals which may be connected to and coordinated by a multi-client modem at a central office serving as a network hub. This architecture allows connected PCs, for instance, to share internet access, printers, file storage, and so forth, but without extra hardware cost like Ethernet cards or upgraded cables. Each connection terminal, such as a PC, is able to communicate with the other as a home network by communicating over a single pair of twisted phone line conductors with the central office modem serving as a network hub. The present invention provides three sharing schemes allowing the multi-client ADSL modems to communicate with the central office, and to communicate with each other through the standard phone line connection. The sharing schemes include frame multiplexing, tone sharing, and code division.

In the frame multiplexing architecture, all connected multi-client ADSL modems receive the same downstream signal from the CO modem. Each multi-client ADSL modem takes the data package addressed to it from the downstream signal. Each multi-client ADSL modem is allowed in schedule to send one or more frames to the CO modem, while the other multi-client ADSL modems keep quiet. This CO modem can return the frame data from one multi-client ADSL modem to another multi-client ADSL modem through downstream channels. One of the multi-client ADSL modems is first connected to the CO modem, and is then configured as the master multi-client ADSL modem.

Using the tone sharing technique, all connected multi-client ADSL modems receive the same downstream signals from the CO modem. Each multi-client ADSL modem takes the data package itself asked, whereby each multi-client ADSL modem uses a number of upstream tones to the CO modem while other multi-client ADSL modems use different tones, and which tones can be sent simultaneously. The CO modem can return the data from one multi-client ADSL modem to another multi-client ADSL modem through downstream channels. One of the multi-client ADSL modems is first connected to the CO modem, and is then configured as the master multi-client ADSL modem. The master multi-client ADSL modem will maintain the super-frame transmission if other multi-client ADSL modems join in, one after another.

Using the code division architecture, all connected multi-client ADSL modems receive the same downstream signal from the CO modem. Each multi-client ADSL modem takes the data package itself asked. Each multi-client ADSL modem is set up to code its data with a special signed key word, such as is used in CDMA wireless applications. The ADSL modem then modulates the coded data in all frames and in all tones. The CO modem can decode the data and re-send the data back to other multi-client ADSL modems through downstream channels.

BRIEF DESCRIPTION OF THE DRAWINGS

FIG. 4 illustrates a method of initializing the multi-client ADSL modems with one becoming the master modem maintaining the superframe.

DESCRIPTION OF THE PREFERRED EMBODIMENT

Figure 1:
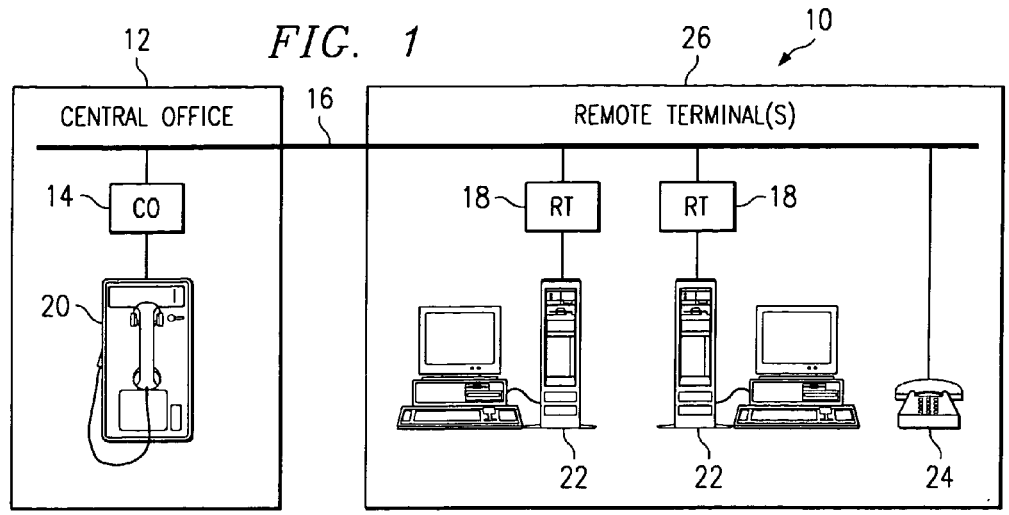
FIG. 1 is a block diagram configuration of two multi-client ADSL modems located within a single residence and each communicating over a single twisted pair phone line to a remote single CO modem for communication with one another, or for communication between either RT modem and the CO modems.

Referring now to FIG. 1, there is shown at 10 a multi-client ADSL network including a central office (CO) 12 having a CO modem 14 connected via a single twisted pair loop of telephone conductors 16 to remote terminal (RT) modems 18. The CO modem 14 is adapted to serve one or more respective communication terminals 20, which may be a landline phone, computer, or wireless communication device. The respective RT modems 18 are adapted to serve respective communication terminals 22 such as PC, wireline phone, or wireless communication terminals such as a personal digital assistant (PDA). Also shown is a standard telephone 24 also connected to and communicating over the single loop carrier 16 for providing voice communications with remote terminals served by the central office 12. In this multi-client modem configuration 10, the RT terminals 22, which may be PCs, can not only access internet communications through the network via resources at the CO 12, but can also communicate at a common site 26 with each other as a local home network or an office network.

Figure 2:
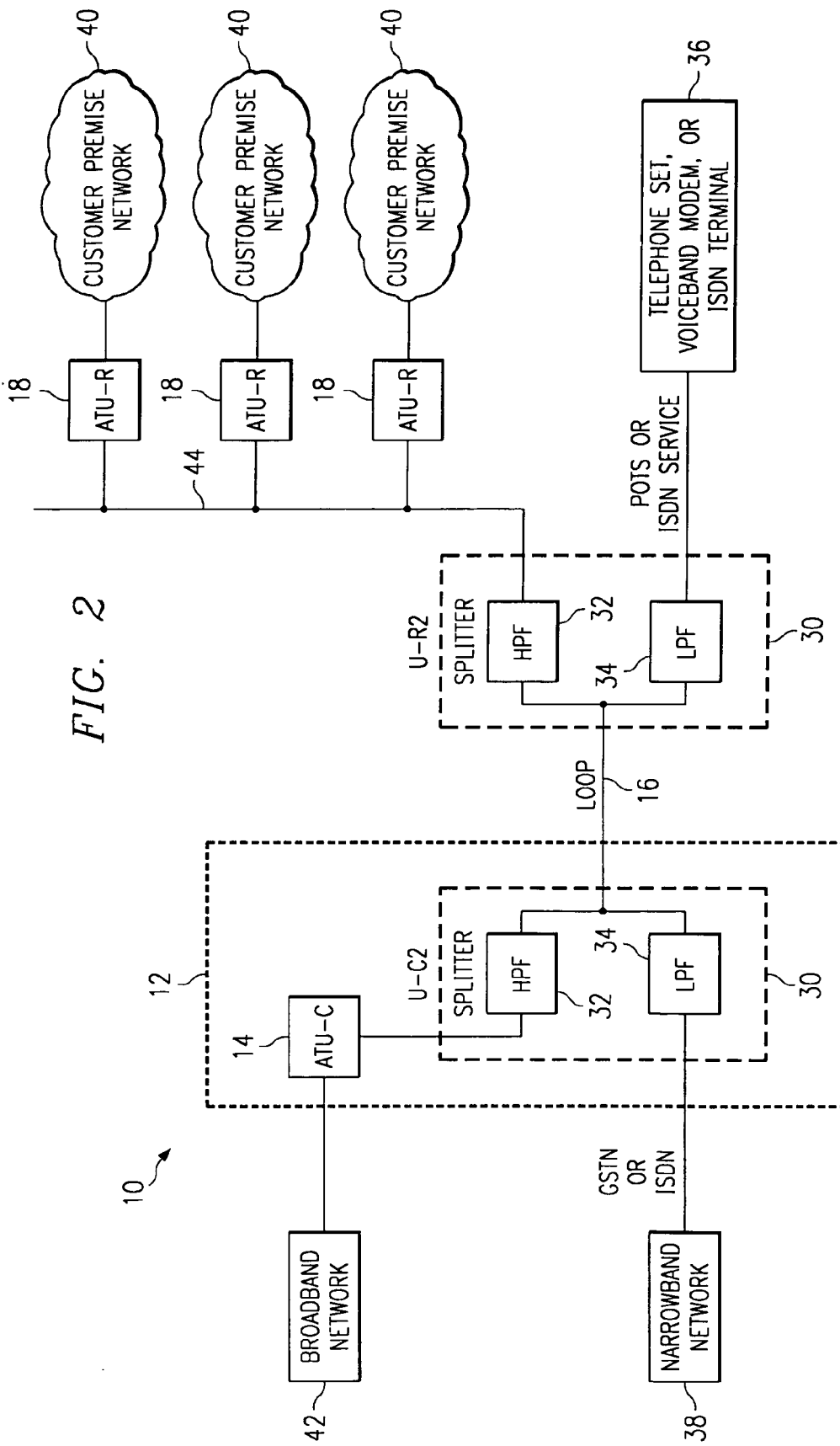
FIG. 2 is a block diagram of a multi-client ADSL system, whereby multi-client ADSL modems each communicate with the central office (CO) modem through one loop carrier comprising a single pair of twisted conductors.

Referring to FIG. 2, there is depicted in more detail the network 10 of FIG. 1 which provides regular ADSL communication service between the residential client modems 18 depicted as ATU-R, via the single loop carrier 16 and the CO modem 14 identified as ATU-C. Both the CO modem 14 and the RT modems 18 are equipped with frequency splitters and network resources 30, each splitter comprising a high pass filter 32 and a low pass filter 34. The high pass filter 32 and the low pass filter 34 each separate the ADSL frequency band communications from the voice frequency band communications. Thus, a telephone set, voice band modem, or ISDN terminal, such as shown at 36, can communicate with a narrowband network 38 via a single loop carrier 16, as shown. Likewise, the high pass filters 32 facilitate communication between customer premise networks 40 via loop carrier 16 with a broadband network 42.

Depicted at 44 is the common single twisted pair of telephone line extending between the remote terminal modems 18, such as in a daisy chain arrangement from outlet to outlet within a home. Each of these RT modems 18 is connected to and communicates through the respective high pass filter 32 of the splitter at the home. The ADSL service communicating between customer premise network 40 and broadband network 42 provides broadband network service to each home communication device in the home network. The voice band communications provide regular Plain Old Telephone Service (POTS) or ISDN telephony service.

The multi-client ADSL system 10 allows each of the multiple client modems 18 to operate on the same single pair of twisted conductor phone line routed through a home or office to communicate with and through a single CO modem 14, simultaneously. No additional equipment or special wiring is needed. Rather, the internal phone line throughout the home is used. With the multi-client ADSL system 10, the remote communication terminals, which are depicted as a customer premise network 40 in FIG. 2, can be locally networked without additional hardware cards, or special wiring such as CAT-5 wiring. The PCs 22 at the residential site 26 can access the internet through the network 10 via the resources at the CO 12, but can also communicate with each other as a local office network or a home network.

Figure 3A:
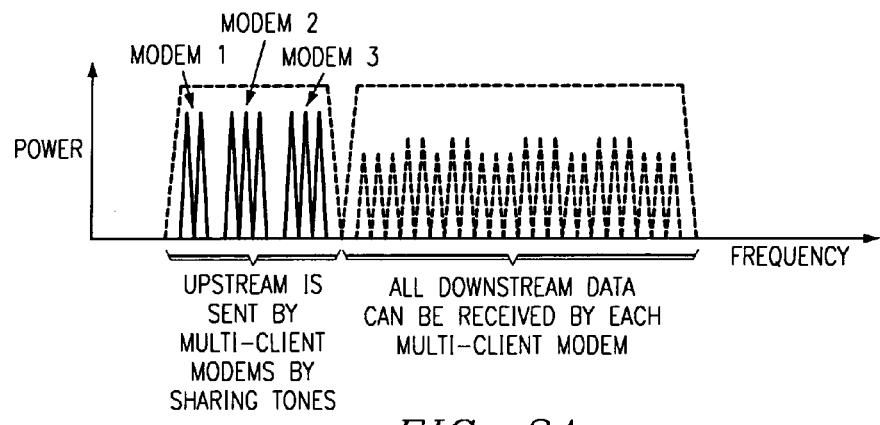
FIG. 3A and FIG. 3B are graphs depicting how the multi-client modems share one upstream channel by frame multiplexing and tone division.
Figure 3B:
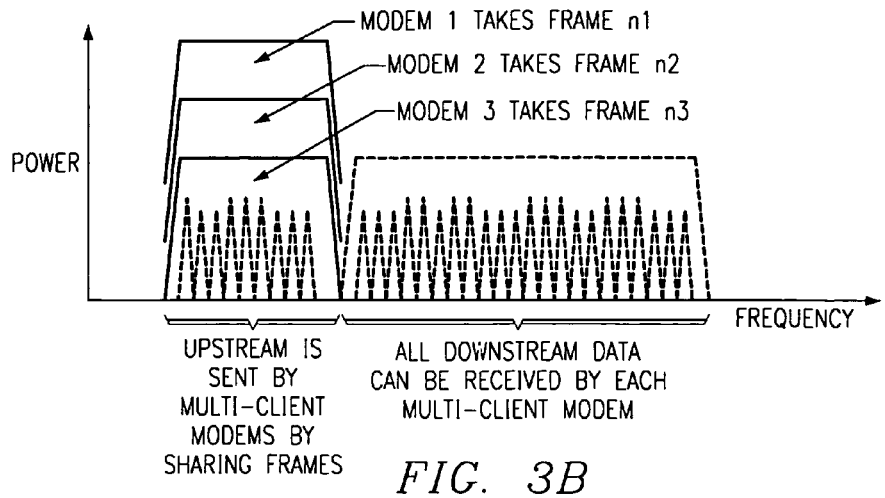

Referring now to FIG. 3A and FIG. 3B, the multi-client modems 18 serving the respective remote terminals 22 can be adapted to share the upstream communications by sending data from the RT modem 18 to the CO modem 14 using frequency division (sharing tones), by time division (sharing frames), or even applying code division like signatures similar to CDMA in wireless communications.

In frequency division, as shown in FIG. 3A, each multi-client modem 18 is assigned unique tones for use on upstream channels. In time division, as shown in FIG. 3B, each multi-client modem 18 utilizes some frames on the upstream channels while the other modems are keeping quiet. Alternatively, code division allows the multi-client modems 18 to send data on upstream channels simultaneously to the CO modem 14, covering all frames and all tones.

On downstream channels, each multi-client modem 18 receives all the data packets from CO modem 14, but is also adapted to ascertain the data packets that it has requested. A data packet has certain information bits that shows its destination, and which information bits such as header bits are used by each RT modem 18 to identify and decipher the associated data therewith to determine if the data is to be interpreted. One of the multi-client ADSL modems 18 is first connected to the CO modem 14 and is responsively configured by the CO modem 14 as the master multi-client ADSL modem 18. This identified master multi-client ADSL modem 18 then maintains a superframe transmission if other multi-client ADSL modems 18 join in, one after another. This superframe is not shared by other multi-client ADSL modems.

Now referring to FIG. 4, there is illustrated at 60 a methodology by which the client modems 18 are initialized for use in the multi-client modem network 10, as shown in FIG. 1 and FIG. 2. The multi-client ADSL system 10 is compliant to the single client ADSL system when only one client modem 18 is connected to the loop carrier 16 comprising a single phone line.

The system 10 first enters into the single modem state at step 62, similar to a normal ADSL system. Next, at step 64, if there is a second modem 18 initialized and turned on, this new added modem 18 requests for connection by signaling the CO modem 14 with a special handshaking message exchange. The CO modem 14 responds to this request by informing the first modem 18 to skip transmitting some frames in a time division implementation, or some tones in a frequency division implementation. The CO modem 14 then provides for the first modem 18 to be re-trained as necessary at step 66. The CO modem 14 informs the first RT modem 18 to be the master modem of the multi-client operation and drops some frames.

At step 68, after re-setup of the first modem 18, the CO modem 14 will acknowledge and start a training process for the second modem whereby the second modem 18 shares the dropped frames. The non-master client modem 18 does not generate the sync frame, which is generated by the master client modem 18 only.

At step 70, if the set-up is ready, the system 10 enters the multi-client modem state, whereby one CO modem 14 communicates with the multiple RT client modems 18 through the single pair of phone line 16 known as loop carrier. If at step 70 the set-up of the system is not ready, the system returns back to step 66. When two or more client modems 18 are joining the single pair phone line 16, the CO modem 14 can re-train the first two modems 14, release more frames or tones for the newly requesting modem 18, then set up the other.

In summary, the present invention provides a local home or office network by which multiple remote terminals at a residential location or office can communicate with one another over a single common pair phone line, without requiring special equipment or additional wiring. The central office modem 14 operates as a network hub, providing ADSL service over a single pair of phone line, to route communications from one remote terminal to another where all the remote terminals may reside within a common location. One remote terminal may communicate with the other, one at a time, or simultaneously depending on the architecture used. The regular telephone service communicating voiceband signals is not affected. Splitters are used to separate the high frequency signals of ADSL from the low frequency signals for voice communications. The present invention utilizes ADSL communications that conform to ADSL standards.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A method of communication in a network comprising a network node and a plurality of modems coupled to the network node by a common master loop, the method comprising:
    initiating communication between a first modem and the network node;
    initiating communication between a second modem and the network node;
    directing the first modem to release a portion of communication bandwidth used by the first modem;
    using the portion of communication bandwidth released by the first modem for the second modem to establish simultaneous communication over the common master loop between the network node and the first and second modems.

2. The method of claim 1, wherein
    the first modem is configured to communicate with the network node as a master terminal while maintaining a superframe of the communication bandwidth.

3. The method of claim 2, wherein
    the first and second modems are configured to communicate with the network node using time division multiplexing; and
    the first modem releases one or more time frames for the second modem to communicate in the network.

4. The method of claim 2, wherein
    the first and second modems are configured to communicate with the network node using frequency division multiplexing; and
    the first modem releases one or more frequency tones for the second modem to communicate in the network.

5. The method of claim 1, wherein the first and second modems are configured to communicate with each other via the network node over the common master loop.

6. The method of claim 1, wherein the first and second modems are configured to communicate in the network using signals compatible with ADSL standards.

7. The method of claim 1, wherein the common master loop comprises a single twisted pair of conductors.

8. A method of operating a modem in a network, the method comprising:
    initializing the modem to communicate with a network node via a master loop; and
    upon receiving a signal from the network node, releasing a portion of communication bandwidth used by the modem for one or more communication terminals coupled to the network node via the master loop, wherein the modem releases the portion of the communication bandwidth while maintaining a superframe of the communication bandwidth.

9. The method of claim 8, wherein
    the modem is configured to communicate with the network node using time division multiplexing; and
    the modem releases one or more time frames for the one or more communication terminals.

10. The method of claim 8, wherein
    the modem is configured to communicate with the network node using frequency division multiplexing; and
    the modem releases one or more frequency tones for the one or more communication terminals.

11. The method of claim 8, wherein the modem and the one or more communication terminals are configured to communicate in the network using signals compatible with ADSL standards.

12. A communication system for communication in a network comprising a network node and a plurality of modems coupled to the network node by a common master loop, the system comprising:
    means for initiating communication between a first modem and the network node;
    means for initiating communication between a second modem and the network node;
    means for directing the first modem to release a portion of communication bandwidth used by the first modem;
    means for using the portion of communication bandwidth released by the first modem for the second modem to establish simultaneous communication over the common master loop between the network node and the first and second modems.

13. The system of claim 12, wherein
    the first modem is configured to communicate with the network node as a master terminal while maintaining a superframe of the communication bandwidth.

14. The system of claim 13, wherein
    the first and second modems are configured to communicate with the network node using time division multiplexing; and
    the first modem is further configured to release one or more time frames for the second modem to communicate in the network.

15. The system of claim 13, wherein
the first and second modems are configured to communicate with the network node using frequency division multiplexing; and the first modem is further configured to release one or more frequency tones for the second modem to communicate in the network.

16. The system of claim 12, wherein the first and second modems are configured to communicate with each other via the network node over the common master loop.

17. The system of claim 12, wherein the first and second modems are configured to communicate in the network using signals compatible with ADSL standards.

18. The system of claim 12, wherein the common master loop comprises a single twisted pair of conductors.

19. A system for operating a modem in a network, the system comprising:
 means for initializing the modem to communicate with a network node via a master loop; and
 means for releasing a portion of communication bandwidth used by the modem, upon receiving a signal from the network node, for one or more communication terminals coupled to the network node via the master loop, wherein the modem releases the portion of the communication bandwidth while maintaining a superframe of the communication bandwidth.

20. The system of claim 19, wherein
the modem is configured to communicate with the network node using time division multiplexing; and
the modem releases one or more time frames for the one or more communication terminals.

21. The system of claim 19, wherein
the modem is configured to communicate with the network node using frequency division multiplexing; and
the modem releases one or more frequency tones for the one or more communication terminals.

22. The system of claim 19, wherein the modem and the one or more communication terminals are configured to communicate in the network using signals compatible with ADSL standards.

* * * * *